UNITED STATES PATENT OFFICE.

FREDERICK C. GILLEN, OF MILWAUKEE, WISCONSIN, ASSIGNOR TO WILLIAM A. KRASSELT, OF MILWAUKEE, WISCONSIN.

PROCESS FOR OBTAINING POTASH FROM POTASH-ROCKS.

1,215,517.

Specification of Letters Patent.

Patented Feb. 13, 1917.

No Drawing.

Application filed April 19, 1915. Serial No. 22,384.

*To all whom it may concern:*

Be it known that I, FREDERICK C. GILLEN, a citizen of the United States, and resident of Milwaukee, in the county of Milwaukee, and State of Wisconsin, have invented new and useful Improvements in Processes for Obtaining Potash from Potash-Rocks, of which the following is a description.

The invention relates to processes for extracting potash from potash rock.

The invention consists more particularly in the extraction of potash from feldspar or orthoclase or other potash rock in a commercially expeditious manner to free the potash from the rock, so that it may be available for use in the industries and other commercial purposes and at a sufficiently low cost to enable the product of the process to be sold at a profit in competition with potassium compounds obtained from natural deposits.

The invention consists in the process hereinafter described and more particularly defined by claims at the conclusion hereof.

In nature, feldspar or orthoclase and other potash rocks are found in large quantities and the following process has been devised for economically extracting potash from these minerals.

The potash rock is ground and in this condition is subjected to the first step of the process which may be accomplished in either what will be termed a "dry" or a "wet" method.

In the "dry" method, the potash rock is mixed with an excess of alkali carbonate or hydrate and fused on the bed of a reverberatory furnace. To aid this re-action, a small quantity of charcoal may be introduced into the mixture, which, while it does not combine with either of the above mentioned constituents of the mixture, does facilitate the fusing of the same by applying additional heat thereto. The fused mass is then lixiviated with hot water according to the method used in preparing sodium aluminate and the resulting solution contains fixed alkali silicate and potassium aluminate.

In the "wet" method, which I prefer, in the first step of the process the ground potash rock is mixed with an excess quantity of fixed alkali carbonate or hydrate to which water is added and the mixture placed in a retort where it is digested with heat and under pressure, the resulting solution containing fixed alkali silicate and potassium aluminate.

These constituents, the fixed alkali silicate and potassium aluminate will react together to form a double salt of alkali aluminium silicate and should it be attempted to separate the potassium from the potassium aluminate by the introduction of carbon dioxid or other suitable reagent to the solution of fixed alkali silicate and potassium aluminate, the formation of this double salt, would prevent the carbon dioxid from acting upon all of the potassium in the potassium aluminate and consequently it is necessary to introduce some constituent or reagent into the solution of fixed alkali silicate and potassium aluminate to temporarily separate them to prevent the formation of the double salt of alkali aluminium silicate.

To accomplish this purpose, the next step of the process is to introduce or add to the heated solution of fixed alkali silicate and potassium aluminate a small quantity of fixed alkali borate. The borate precipitates the aluminium in the potassium aluminate in the form of aluminium borate and thereby holds the fixed alkali silicate and potassium aluminate temporarily separated, preventing the formation of the double salt of alkali silicate. Thus the treating of the ground rock with alkali carbonate or hydrate and alkaline borate results in the breaking down of the rock into compounds from which the constituents, the potash alumina and silica, may be separated.

On the temporary separation of the fixed alkali silicate and potassium aluminate by the introduction of the alkaline borate, the third step of the process consists in the addition of carbon dioxid to the solution, which changes the potassium in the solution into potassium carbonate, before the double salt can be formed, and the further addition of carbon dioxid causes the alkali carbonate, formed thereby, to change the aluminium borate to alumina or aluminium hydrate and alkaline borate when it is still hot from its previous heating in the retort. The resulting solution will therefore contain all the fixed alkali carbonate introduced into the process together with the potassium in the rock in the form of potassium carbonate and all the alkaline borate introduced into the process to prevent the formation of the double salt and permit the carbon dioxid to unite directly with the potassium, giving a by-product of aluminium silicate from which potash may be readily separated out by well known chemical methods.

By the term "fixed alkali carbonate or hydrate" is meant either potassium hydrate or carbonate or sodium hydrate or carbonate. Though potassium carbonate or hydrate is preferred in the carrying out of the process, sodium carbonate or hydrate may be used and it is to be noted in this instance the soda is to be separated from the potash by crystallization after the addition of the carbon dioxid to the solution of the fixed alkali silicate and potassium aluminate and alkaline borate.

The invention thus exemplifies a process for extracting potash from potash rocks, consisting in its preferred form in subjecting a mixture of ground potash rock and an excess of alkali carbonate or hydrate in solution to heat and under pressure to form a solution of fixed alkali silicate and potassium aluminate, then adding a small quantity of alkaline borate to prevent the formation of a double salt between the fixed alkali silicate and the potassium aluminate and then adding carbon dioxid to the solution while under the influence of the action of the alkaline borate to permit the carbon dioxid to unite directly with the potassium to form potassium carbonate in solution from which solution the potash may be readily separated by well known chemical methods.

What I claim as my invention is:—

1. The process of decomposing potash rock which consists in mixing ground potash rock with an excess of fixed alkali hydrate, adding water to this mixture and heating it under pressure to form a solution of fixed alkali silicate and potassium aluminate, adding alkaline borate to this solution to temporarily prevent the formation of the double salt of alkali aluminium silicate, and then adding a reagent to this solution while it is under the temporary action of the alkaline borate to separate the silica therefrom and to form a solution of potassium salt and fixed alkali carbonate from which the potassium salt may be separated.

2. The process of decomposing potash rock which consists in mixing ground potash rock with an excess of fixed alkali carbonate, adding water to this mixture and heating it to form a solution of fixed alkali silicate and potassium aluminate, adding alkaline borate to prevent the formation of a double salt of alkali aluminium silicate, and then adding carbon dioxid to this solution to form a solution containing potassium carbonate, fixed alkali carbonate and alkaline borate from which the potassium carbonate may be separated.

3. The process of decomposing potash rock which consists in mixing ground potash rock with water and an excess of fixed alkali carbonate and subjecting this mixture to pressure and heat to form a solution containing fixed alkali silicate and potassium aluminate, adding alkaline borate to this solution to temporarily prevent the formation of a double salt of alkali aluminium silicate, and then adding carbon dioxid to the solution while it is under the action of the alkaline borate to form a solution containing potassium carbonate and fixed alkali carbonate from which the potassium may be separated.

4. The steps of the process for treating potash rock which consist in decomposing the ground rock in a heated solution of alkali hydrate and adding alkaline borate to this heated solution to break down the rock into compounds from which the potash, alumina and silica may be separated.

5. The steps of the process for treating potash rock which consist in mixing the ground rock with a strong solution of alkali hydrate, heating the mixture under pressure and adding alkaline borate to the heated solution.

In testimony whereof, I affix my signature, in presence of two witnesses.

FREDERICK C. GILLEN.